(12) United States Patent
Biswas et al.

(10) Patent No.: US 11,868,216 B1
(45) Date of Patent: Jan. 9, 2024

(54) CLASSIFICATION-BASED DATA RECOVERY MANAGEMENT

(71) Applicant: Amazon Technologies, Inc., Seattle, WA (US)

(72) Inventors: Koushik Biswas, Argyle, TX (US); James William Fogel, San Francisco, CA (US); Dhananjay Baburao Karanjkar, Pune (IN); Douglas John Youd, San Francisco, CA (US); Allistaire Mair, Miami, FL (US); James Ryan Powers, Center Line, MI (US)

(73) Assignee: Amazon Technologies, Inc., Seattle, WA (US)

( * ) Notice: Subject to any disclaimer, the term of this patent is extended or adjusted under 35 U.S.C. 154(b) by 128 days.

(21) Appl. No.: 17/457,381

(22) Filed: Dec. 2, 2021

(51) Int. Cl.
*G06F 11/14* (2006.01)
*G06F 16/27* (2019.01)
*G06F 16/18* (2019.01)
*G06F 16/906* (2019.01)

(52) U.S. Cl.
CPC ...... *G06F 11/1469* (2013.01); *G06F 11/1471* (2013.01); *G06F 16/1873* (2019.01); *G06F 16/27* (2019.01); *G06F 16/906* (2019.01)

(58) Field of Classification Search
CPC ............ G06F 11/1469; G06F 11/1471; G06F 16/1873; G06F 16/906
See application file for complete search history.

(56) References Cited

U.S. PATENT DOCUMENTS

| | | | |
|---|---|---|---|
| 8,261,122 B1 * | 9/2012 | Kappel | G06F 11/34 714/33 |
| 10,834,158 B1 * | 11/2020 | Bourgoyne | H04L 65/612 |
| 11,042,503 B1 * | 6/2021 | Vig | G06F 11/1451 |
| 2006/0053181 A1 * | 3/2006 | Anand | G06F 11/0781 |

* cited by examiner

*Primary Examiner* — Merilyn P Nguyen
(74) *Attorney, Agent, or Firm* — Knobbe, Martens, Olson & Bear, LLP

(57) ABSTRACT

Systems and methods are provided for management of data item recovery operations based on classification of data items with respect to a target recovery time. Data items may be classified using metadata regarding versioning and other data storage operations performed on the data items, and the timing of those storage operations with respect to the target recovery time (TRT). Each class may be associated with one or more recovery actions. The recovery actions may involve modifying the metadata rather than the underlying data items.

20 Claims, 10 Drawing Sheets

CLASSIFICATION-BASED DATA RECOVERY MANAGEMENT

BACKGROUND

Computing devices can utilize communication networks to exchange data. Companies and organizations operate computer networks that interconnect a number of computing devices to support operations or to provide services to third parties. The computing devices can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

Data centers may provide data storage services configured to store data submitted by client devices, and enable retrieval of that data over a network. A variety of types of data storage services can be provided, often varying according to their input/output (I/O) mechanisms. For example, database services may allow I/O based on a database query language, such as the Structured Query Language (SQL). Block storage services may allow I/O based on modification to one or more defined-length blocks, in a manner similar to how an operating system interacts with local storage, and may thus facilitate virtualized disk drives usable, for example, to store an operating system of a virtual machine. Object storage services may allow I/O at the level of individual objects or resources, such as individual files, which may vary in content and length.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
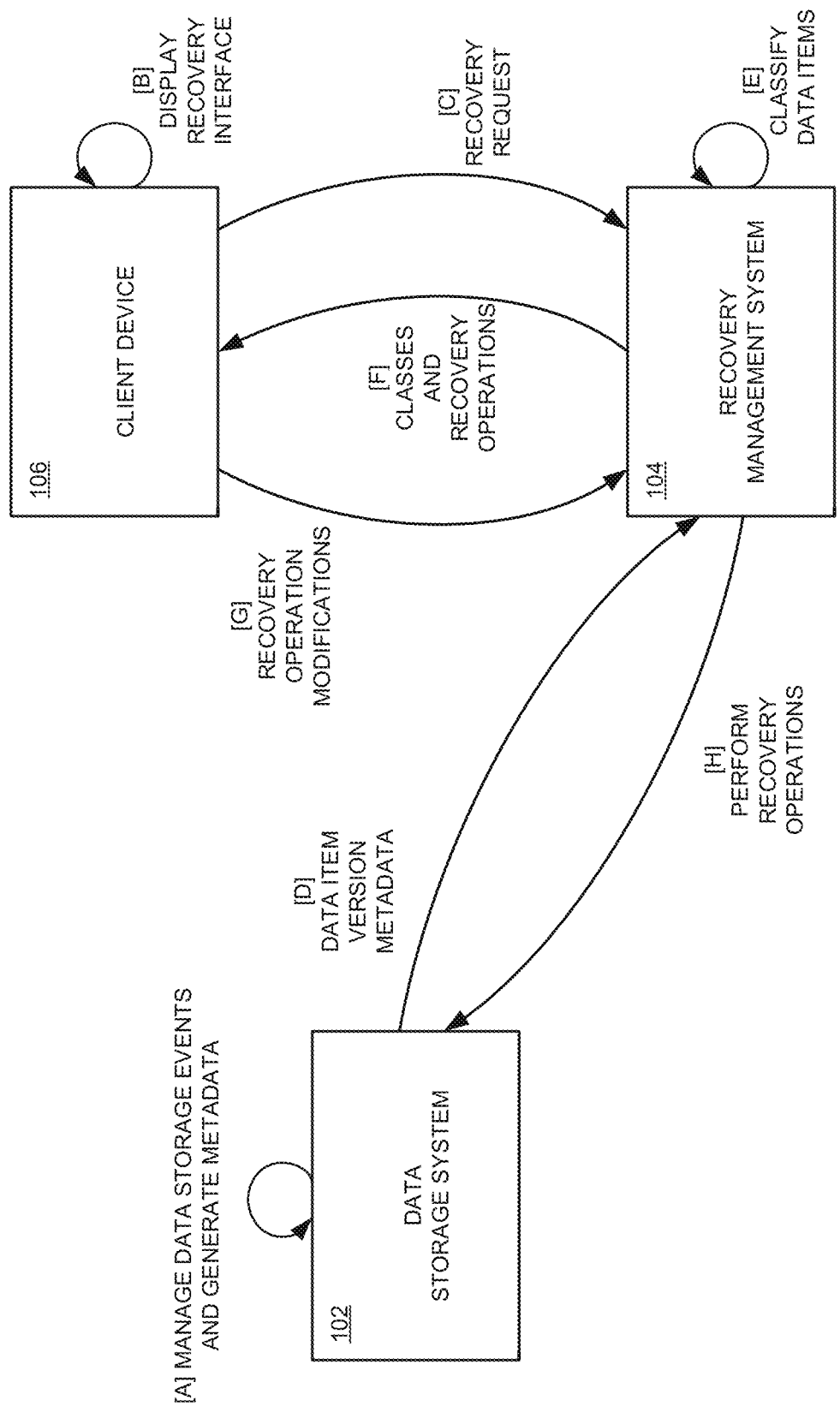
FIG. 1 is a block diagram illustrating data flows and interactions between a client device, a data storage system, and a recovery management system according to some embodiments

The present disclosure relates to management of data item recovery operations based on classification of data items with respect to a target recovery time. Data items may be classified using metadata regarding versioning and other data storage operations performed on the data items, and the timing of those storage operations with respect to the target recovery time (TRT). Beneficially, such classification facilitates identification of possible issues in recovery of prior versions of the data items, and automated determination of recovery actions for data items. These benefits may be particularly advantageous when performing recovery procedures that may affect hundreds of thousands, millions, or more individual data items, when each data item may have any number of different versions.

Some storage systems allow recovery operations to be performed on an item-by-item basis by allowing users to select the particular recovery operation for each data item (e.g., undelete, roll back to prior version, maintain current version, etc.). However, this process may be quite time consuming and, in some cases, impossible for all practical purposes, such as when dealing with large numbers of data items (e.g., hundreds of thousands, millions, or more) and/or when there are several different versions of data items from which to choose. Some storage systems store copies of data to other locations for backup purposes. When a recovery operation is to be performed, entire sets of data items may be restored to a backup checkpoint. However, storing and transmitting copies of large quantities of data items (e.g., millions or billions of individual data items) and/or large amounts of data (e.g., petabytes or exabytes of data) can be time consuming and expensive.

Some aspects of the present disclosure address the issues noted above, among others, by automatically classifying data items based on metadata regarding available versions of the data items and other storage operations performed on the data items. When a TRT is specified for recovery of a data set, a recovery management system can use the TRT to analyze versioning metadata representing available versions of the data items and/or storage operations performed. Based on results of this analysis, data items may be classified into different classes, where each class is associated with one or more recovery actions. Moreover, the classes are determined using metadata, and some or all of the recovery actions may involve modifying the metadata rather than the underlying data items, thereby saving time and resources that would otherwise be required to copy, transmit, and perform other recovery operations.

In some embodiments, a class may be defined for data items for which any storage operation occurring after the TRT is a delete operation. By removing the version metadata regarding the delete operation, the version of the data item that was available prior to the delete operation may become available again. As another example, a class may be defined for data items for which there are no storage operations occurring after the TRT, and the latest storage operation occurring prior to the TRT is not a delete operation. In this case, no action may be needed because the latest version currently available is the same as the latest version prior to the TRT. As another example, a class may be defined for data items having a version that was created after the TRT. In this case, one of several operations may be performed, such as: copying a desired version (e.g., the latest version prior to the TRT) as the new latest version overall to avoid any data loss; deleting versions created after the desired version (rather than merely indicating deletion via metadata), thereby accepting data loss; or doing nothing. As another example, a class may be defined for data items having no versions created and no other data storage operations performed after the TRT, and having the latest storage operation performed prior to the TRT being a deletion operation. In this case, the data item will remain deleted after recovery to the TRT, unless the TRT is adjusted to be prior to the deletion operation. As another example, a class may be defined for data items where there are no versions available prior to the TRT (but possibly deletion storage operations). In this case, there may be no recovery option possible.

Additional aspects of the present disclosure relate to an algorithm and data structure for efficient and accurate classification of data items into recovery classes. When a TRT is specified for a data set, a recovery management system may obtain version metadata regarding data items in the data set. The metadata may be sorted in reverse chronological order such that the latest record representing a version or other storage operation is first, followed by the second latest record, and so on. The recovery management system may use a bidirectional doubly linked list to efficiently store version data for a particular data item in memory. As version metadata records are read and added to the data structure in reverse chronological order, classification determinations may be triggered when certain conditions are met. Advantageously, use of the algorithm and data structure may permit determination of a recovery group classification in a short amount of time and in a resource-optimized manner. In some embodiments, the data structure includes a "pivot" element for the TRT. The recovery management system may continue to process metadata records and add elements to the data structure until there are a threshold number of elements (e.g., at least one) positioned chronologically prior to the pivot element (and therefore prior to the TRT), at which point a recovery classification may be made.

Various aspects of the disclosure will now be described with regard to certain examples and embodiments, which are intended to illustrate but not limit the disclosure. Although aspects of some embodiments described in the disclosure will focus, for the purpose of illustration, on particular examples of storage systems, data sets, recovery classifications, recovery operations, and data structures, the examples are illustrative only and are not intended to be limiting. In some embodiments, the techniques described herein may be applied to additional or alternative storage systems, data sets, recovery classifications, recovery operations, data structures, and the like. Moreover, any feature used in any embodiment described herein may be used in any combination with any other feature, without limitation.

Data Storage Operations and Recovery Request

FIG. 1 is a block diagram of an illustrative computing environment 100 in which a data storage system 102 may store data objects, and a recovery management system 104 may respond to recovery requests from a client device 106 by classifying data items stored in the data storage system 102 and executing corresponding recovery actions.

The data storage system 102 can operate to enable clients to read, write, modify, and delete data objects or other data items. In the description that follows, the terms "data object" and "data item" will be used interchangeably to refer to discrete, separately accessible units of data that may be stored in the data storage system 102 and accessed therefrom.

The data storage system 102 illustratively includes one or more nodes which provide an interface (a command-line interface (CLI), application programing interface (API), or other programmatic interface) through which client devices 106 or other data accessors can interface with the data storage system 102. For example, a client device 106 may interact with a node to create a data set or other collection of data objects on the data storage system 102 (e.g., a "bucket" of objects) and to configure permissions for that collection. Client devices 106 may thereafter create, read, update, or delete objects within the collection based on the interfaces of the nodes. In one embodiment, a node provides a REST-compliant HTTP interface supporting a variety of request methods, each of which corresponds to a requested I/O operation on the data storage system 102. By way of non-limiting example, request methods may include:

- a GET operation requesting retrieval of an object stored on the data storage system 102 by reference to an identifier of the object;
- a PUT operation requesting storage of an object to be stored on the data storage system 102, including an identifier of the object and input data to be stored as the object;
- a DELETE operation requesting deletion of an object stored on the data storage system 102 by reference to an identifier of the object; and
- a LIST operation requesting listing of objects within an object collection stored on the system 102 by reference to an identifier of the collection.

Data items may be stored, for example, in one or more of the data storage systems storage nodes, which correspond to any persistent or substantially persistent storage (including hard disk drives (HDDs), solid state drives (SSDs), network accessible storage (NAS), storage area networks (SANs), non-volatile random access memory (NVRAM), or any of a variety of storage devices known in the art).

The data storage system 102 may support versioning of the data items whereby modifications to a data item result in storage of a new version of the data item, while the prior version of the data item (e.g., before the modification) is retained. In some embodiments, the data storage system 102 may support differential versioning. For example, instead of storing a complete copy of each prior version of a given data item when a new version is created, the data storage system 102 may store a differential data (e.g., a "reverse delta") that may be applied to the current version to recovery the prior version. The process may be repeated, as needed, by applying additional differential data to recovered versions to recover older versions, such as when there are two or more prior versions of a data item.

As shown at [A], the different versions may be tracked and managed using data-item-specific version metadata. The data item-specific metadata (also referred to simply as "metadata" for brevity) may include individual storage metadata items for each version of the data item with which the storage metadata item is associated. For example, when the data item is initially created, a first storage metadata item may be created to record the data item creation event and associated information, such as a timestamp of creation event. When the data item is modified and a new version is created, a second storage metadata item may be created to record the creation of the new version and associated information such as a timestamp of the new version event. The process may be repeated, as needed, each time the data item is modified and a new version is created. When the data item is deleted, the latest version of the data item (and, in some cases, any prior versions) may not necessarily be removed from or be overwritten by the data storage system 102. Instead, the data item may be marked as deleted (e.g., in an index of the data storage system 102). In addition, a storage metadata item may be created to record the deletion of the data item, and associated information such as a timestamp of the deletion event.

A client device 106 can be any computing device such as a sever computer, desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, a client device 106 may be a host computing device executing one or more virtual computing systems within a data center, which may or may not be a same data center that includes one or more computing systems of the data storage system 102 and/or the recovery management system 104.

As shown at [B], the client device 106 may display a user interface for initiation of a recovery. In some embodiments, the recovery may be rollback of a data set to a prior point in time. For example, a user may notice that one or more data items in a set of data items (e.g., a bucket, folder, etc.) have been unexpectedly or undesirably deleted or modified, and may wish to roll back the data set to recover the prior versions of the data items. The user may specify a target recovery time (TRT) to which the data set is to be rolled back. The request and specified TRT may be provided to the recovery management system 104 at [C].

The recovery management system 104 can be or include any computing device. In some embodiments, a recovery management system 104 may be implemented on a host computing device executing within a data center, which may or may not be a same data center that includes one or more computing systems of the data storage system 102 and/or the client device 106.

The recovery management system 104 can operate to enable clients to request and manage recovery operations associated with data stored in the data storage system 102. For example, in response to a recovery request and selection of at TRT, the recovery management system 104 can obtain metadata from the data storage system 102 at [D] for the data items in the data set to be recovered. At [E], the recovery management system 104 can classify the data items based on the metadata representing prior versions and other storage events (e.g., deletion events) for the data items.

At [F] the recovery management system 104 can provide data regarding the classes of the data items and determined recovery operations to the client device 106. A user of the client device 106 may use an interface to modify any number of the recovery actions, such as by selecting a substitute recovery action, choosing not to perform any recovery action, etc. as described in greater detail below. Results of such recovery operation modifications may be provided to the recovery management system 104 at [G].

At [H] the recovery management system 104 can initiate recovery operations (also referred to herein as recovery actions) based on the determined classes for the data items. Example routines and data structures for classifying data items based on item-specific metadata and performing corresponding recovery actions are described in greater detail below.

The client device 106, recovery management system 104, data storage system 102, and/or individual devices thereof may communicate via a network, which may include any wired network, wireless network, or combination thereof. For example, the network may be or include a personal area network, local area network, wide area network, over-the-air broadcast network (e.g., for radio or television), cable network, satellite network, cellular telephone network, or combination thereof. As a further example, the network may be a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or any other type of wireless network. The network can use protocols and components for communicating via the Internet or any of the other aforementioned types of networks. For example, the protocols used by the network may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Metadata and Target-Recovery-Time-Based Classification

Figure 2:
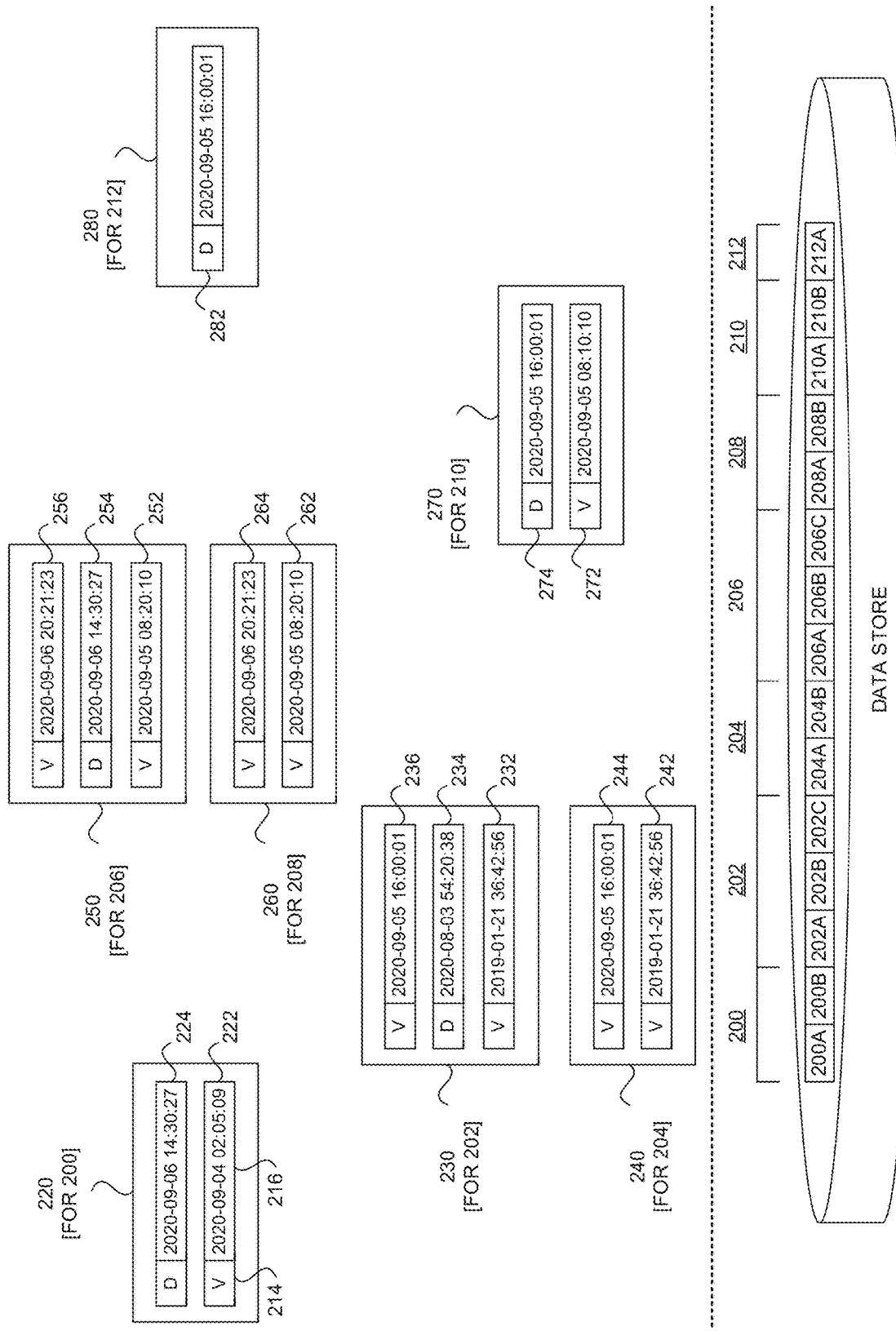
FIG. 2 is a block diagram of illustrative data item metadata after various data storage operations according to some embodiments.

FIG. 2 is a block diagram of illustrative sets of item-specific metadata for various data items 200, 202, 204, 206, 208, 210, and 212 in a data set stored on the data storage system 102. As shown, each data item is stored in a data store as a collection of versions of the data item, and each data item has its own set of item-specific metadata representing the various versions and other storage operations of the data item. Individual storage metadata items are referred to as "metadata items" for brevity.

Metadata 220 includes metadata items for versions 200A and 200B of data item 200. The metadata 220 includes a metadata item 222 representing creation of a version of the data item 200, and metadata item 224 representing a deletion event for data item 200. In some embodiments, as shown, each metadata item may include a type identifier 214 indicating a type of storage event represented by the metadata item. For example, the type identifier 214 may indicate whether the corresponding storage event is a version creation event (e.g., when a data item is originally created, or when the data item is modified and a new version is created to replace a prior version), a deletion event (e.g., when the data item is deleted such that it is not to be accessed), or some other storage event. In the illustrated example, version creation events are indicated by a "V" and deletion events are indicated by a "D." In some embodiments, as shown, each metadata item may include timestamp 216 indicating the time of the associated event. For example, the timestamp 216 may be a date and time, an offset from a reference time, or the like.

Metadata 230 includes metadata items for versions 202A, 202B, and 202C of data item 202. The metadata 230 includes metadata item 232 and 236 representing creation of different versions of the data item 202, and metadata item 234 representing a deletion event for data item 202.

Metadata 240 includes metadata items for versions 204A and 204B of data item 204. The metadata 240 includes metadata items 242 and 244 representing creation of different versions of the data item 204. There is no metadata item representing a deletion event for data item 204.

Metadata 250 includes metadata items for versions 206A, 206B, and 206C of data item 206. The metadata 250 includes metadata item 252 and 256 representing creation of different versions of the data item 206, and metadata item 254 representing a deletion event for data item 206.

Metadata 260 includes metadata items for versions 208A and 208B of data item 208. The metadata 260 includes metadata items 262 and 264 representing creation of different versions of the data item 208. There is no metadata item representing a deletion event for data item 208.

Metadata 270 includes metadata items for versions 210A and 210B of data item 210. The metadata 270 includes metadata item 272 representing creation of a version of the data item 210, and metadata item 274 representing a deletion event for data item 210.

Metadata 280 includes a metadata item for version 212A of data item 212. The metadata 220 includes metadata item 282 representing a deletion event for data item 212. There is no metadata item representing a creation of a version of the data item 212.

Figure 3:
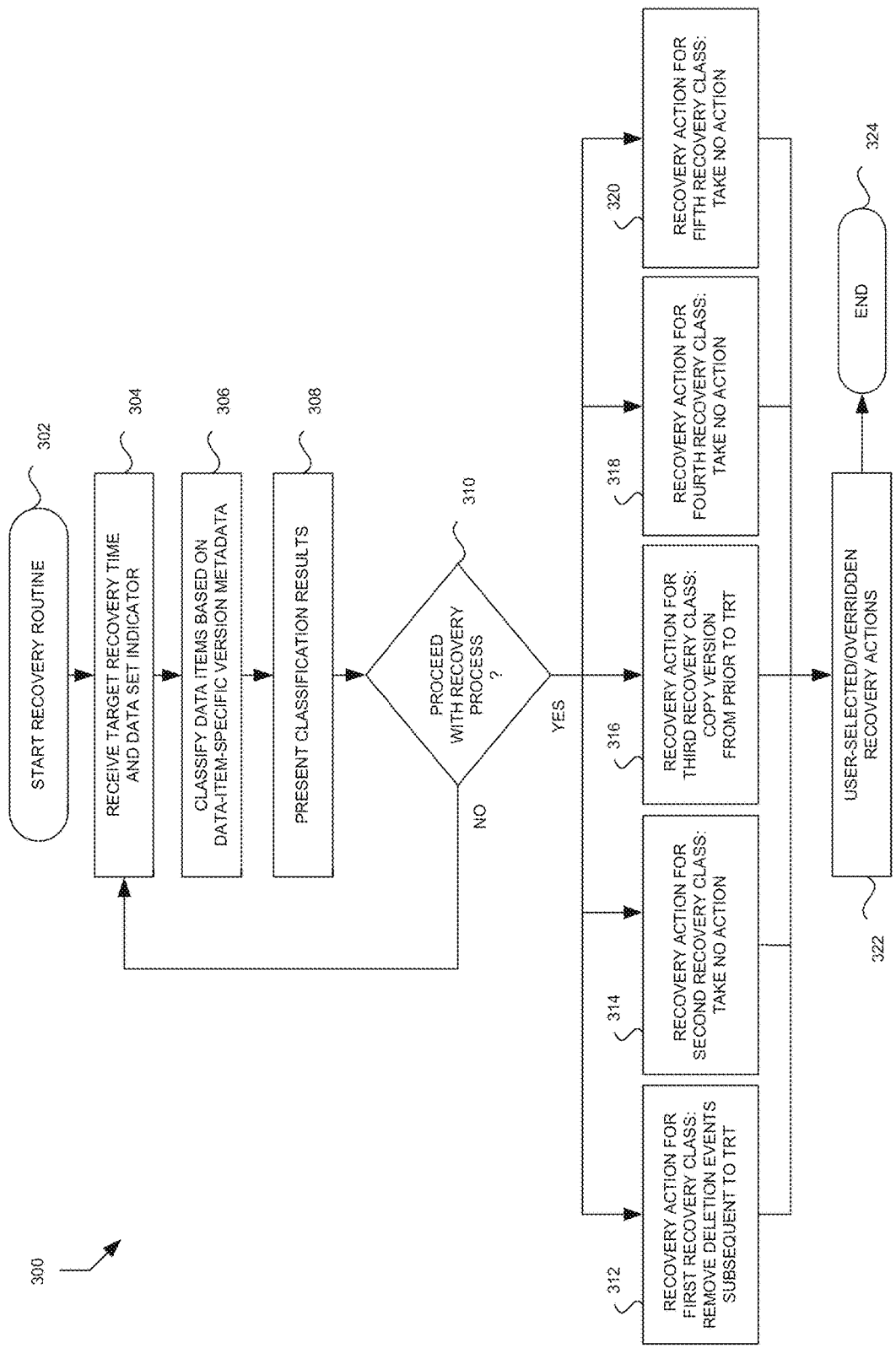
FIG. 3 is a flow diagram of an illustrative routine that may be performed to recover deleted data items according to some embodiments.

FIG. 3 is a flow diagram of an example routine 300 for classifying data items based on item-specific metadata and a TRT, and implementing recovery actions to modify the item-specific metadata based on data item classifications.

The routine 300 begins at block 302. In some embodiments, routine 300 may begin in response to an event, such as when the recovery management system 104 begins operation. When the routine 300 is initiated, a set of executable program instructions stored on one or more non-transitory computer-readable media (e.g., hard drive, flash memory, removable media, etc.) may be loaded into memory (e.g., random access memory or "RAM") of a computing device and executed. In some embodiments, the routine 300 or portions thereof may be implemented on multiple processors, serially or in parallel.

At block 304, the recovery management system 104 or some other system or component may receive input for the recovery routine 300. In some embodiments, the input may represent selection of a TRT to which an indicated data set is to be recovered. Illustratively, the TRT may be the time to which a particular data set (e.g., a bucket, directory, or other group) is to be restored. The desired restoration may be a rollback of all data items in the indicated data set to the versions that were available at the time of the TRT.

Figure 4:
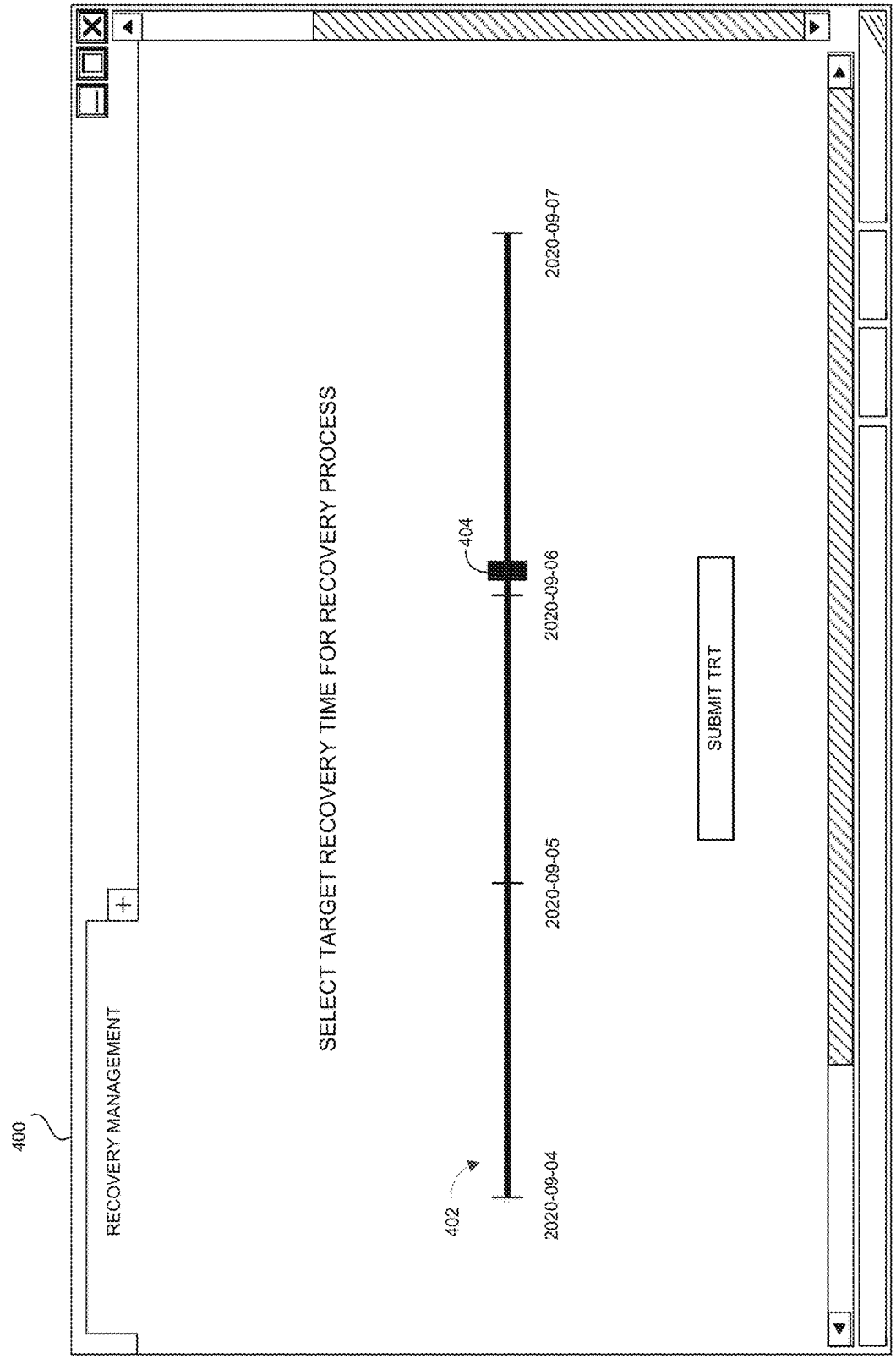
FIG. 4 is a diagram of an illustrative user interface for selecting a target recovery time according to some embodiments.

FIG. 4 shows an illustrative user interface 400 that may be used to select the TRT. In some embodiments, the user interface 400 may be a network resource, such as a web page, that is provided to a client device 106 by the recovery management system 104 or some other system. As shown, the user interface 400 may include a timeline 402 in which the TRT can be indicated. The user interface 400 may further include an interactive graphic object, such as a slider control 404. The slider control 402 may be configured to be moved with respect to the timeline 402 such that the selected TRT corresponds to a position on the timeline 402 to which the slider control 404 or another interactive graphic object is moved. Data representing the TRT, or from which the TRT can be derived (e.g., a relative or absolution position on the timeline 402) can be sent to the recovery management system 104.

Returning to FIG. 3, at block 306 the recovery management system 104 or some other system can classify the data items in the data for which a recovery procedure is to be performed. The classification determinations may be based on data-item-specific metadata for the individual data items, and the TRT. An example routine for classifying data items is described in greater detail below.

Figure 5:
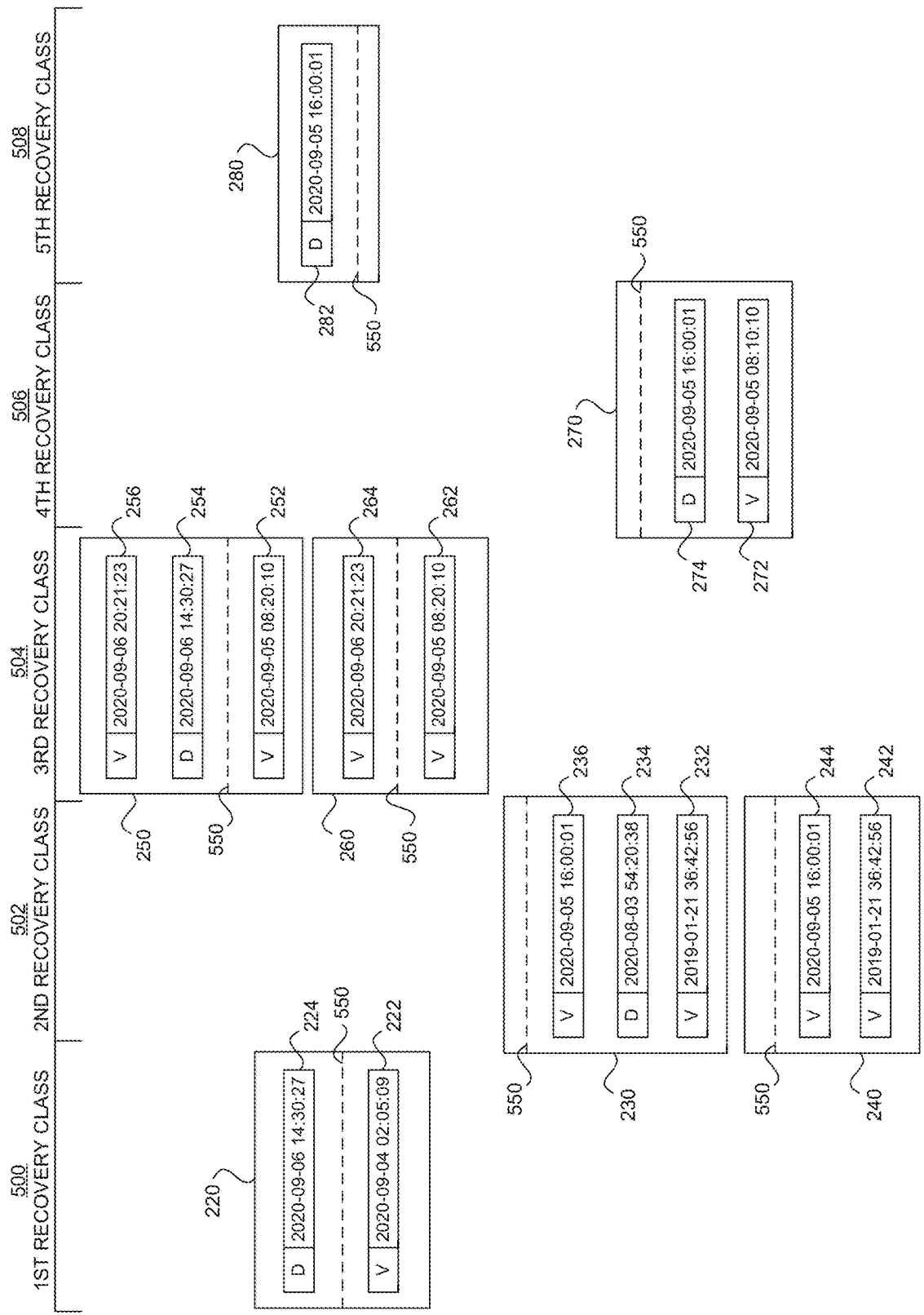
FIG. 5 is a block diagram of illustrative data item metadata classified based on target recovery time according to some embodiments.

FIG. 5 is a block diagram of the illustrative sets of data-item-specific metadata shown in FIG. 2, classified based on TRT according to some embodiments.

As shown, data item 200 has been classified in a first recovery class 500 based on the TRT and the metadata 220 for data item 200. In the illustrated example, the first recovery class 500 is determined for data items in which all data storage events newer than the TRT are deletion events. The TRT 550 is shown as a dashed line with the metadata 220 for data item 200. As shown, all metadata items having timestamps chronologically subsequent to the TRT 550 are positioned above the TRT 550. Because all such metadata items are for deletion events, the data item 200 is classified in the first recovery class. The first recovery class may be referred to as "R-OK-1" where "R" stands for "Recovery," "OK" represents the property that these data items can be recovered without conflicts or data loss, and "1" represents the cardinality of choice in comparison with other "R-OK" classes.

Data items 202 and 204 have been classified into a second recovery class 502 based on the TRT and the metadata 230 and 240 for data items 202 and 204, respectively. In the illustrated example, the second recovery class 502 is determined for data items in which all data storage events are older than the TRT. As shown, all metadata items in metadata 230 and 240 having timestamps chronologically prior to the TRT 550 are positioned below the TRT 550. In addition, the most recent metadata data items 236 and 244 in metadata 230 and 240, respectively, are not deletion events. Thus, all such data items 202 and 204 are classified in the second recovery class. The second recovery class may be referred to as "R-OK-2."

Data items 206 and 208 have been classified into a third recovery class 504 based on the TRT and the metadata 250 and 260 for data items 206 and 208, respectively. In the illustrated example, the third recovery class 504 is determined for data items in which there are data storage events other than deletion events (e.g., version creation events) occurring more recently than the TRT. As shown, at least metadata items 256 and 264 in metadata 250 and 260, respectively, are for version creation events and have timestamps chronologically subsequent to the TRT 550. Thus, all such data items 206 and 208 are classified in the third recovery class. The third recovery class may be referred to as "R-USER-1" where "USER" represents the condition that a user is encouraged to review and select a recovery action for these data items. For example, as described in greater detail below, the recovery action options for this group can include: (1) copying a desired version on top of the latest version to avoid data loss; (2) deleting versions newer than the TRT, thereby accepting data loss; and/or (3) choosing a different TRT in an effort to cause a different classification of these data items.

Data item 210 has been classified into a fourth recovery class 506 based on the TRT and the metadata 270 for the data item 210. In the illustrated example, the fourth recovery class 506 is determined for data items in which all data storage events are older than the TRT, and the most recent metadata item represents a deletion event. As shown, all metadata items in metadata 270 have timestamps chronologically prior to the TRT 550 and are positioned below the TRT 550. In addition, the most recent metadata data item 274 represents a deletion event. Thus, the data item 210 is classified in the fourth recovery class. The fourth recovery class may be referred to as "R-USER-2."

Data item 212 has been classified into a fifth recovery class 508 based on the TRT and the metadata 280 for the data item 212. In the illustrated example, the fifth recovery class 508 is determined for data items in which all data storage events are deletion events; there are no version creation events represented by the metadata and therefore there are no versions of the data item that are recoverable. As shown, all metadata items in metadata 280 are for deletion events. Thus, the data item 212 is classified in the fifth recovery class. The fifth recovery class may be referred to as "R-X."

Although a set of five recovery classes are shown and described herein, the examples are not intended to be limiting, required, or exhaustive. In some embodiments, fewer, additional, and/or alternative recovery classes may be used. For example, a separate class or variant of one of the classes described above (e.g., "R-X") may be used for data items having data-item-specific metadata representing a large number of storage operations (e.g., thousands of events per day). Though it may be possible to recover such a data item to a particular TRT, the processing of such a large volume of metadata items (e.g., 1,000s per day for a TRT that is x days in the past=1,000× metadata items to process) may be time consuming and delay recovery of other data objects. Such a delay for a single data item may not be desirable. Nevertheless, in some embodiments a user may override a determination to take no action for such a data item, as described in greater detail below.

At block 308, the recovery management system 104 or some other system can cause presentation of a user interface (or updated user interface) to display data regarding data item classifications and corresponding recovery actions. The user interface may allow users to view and, in some cases, modify the recovery actions to be performed for data items.

Figure 6:
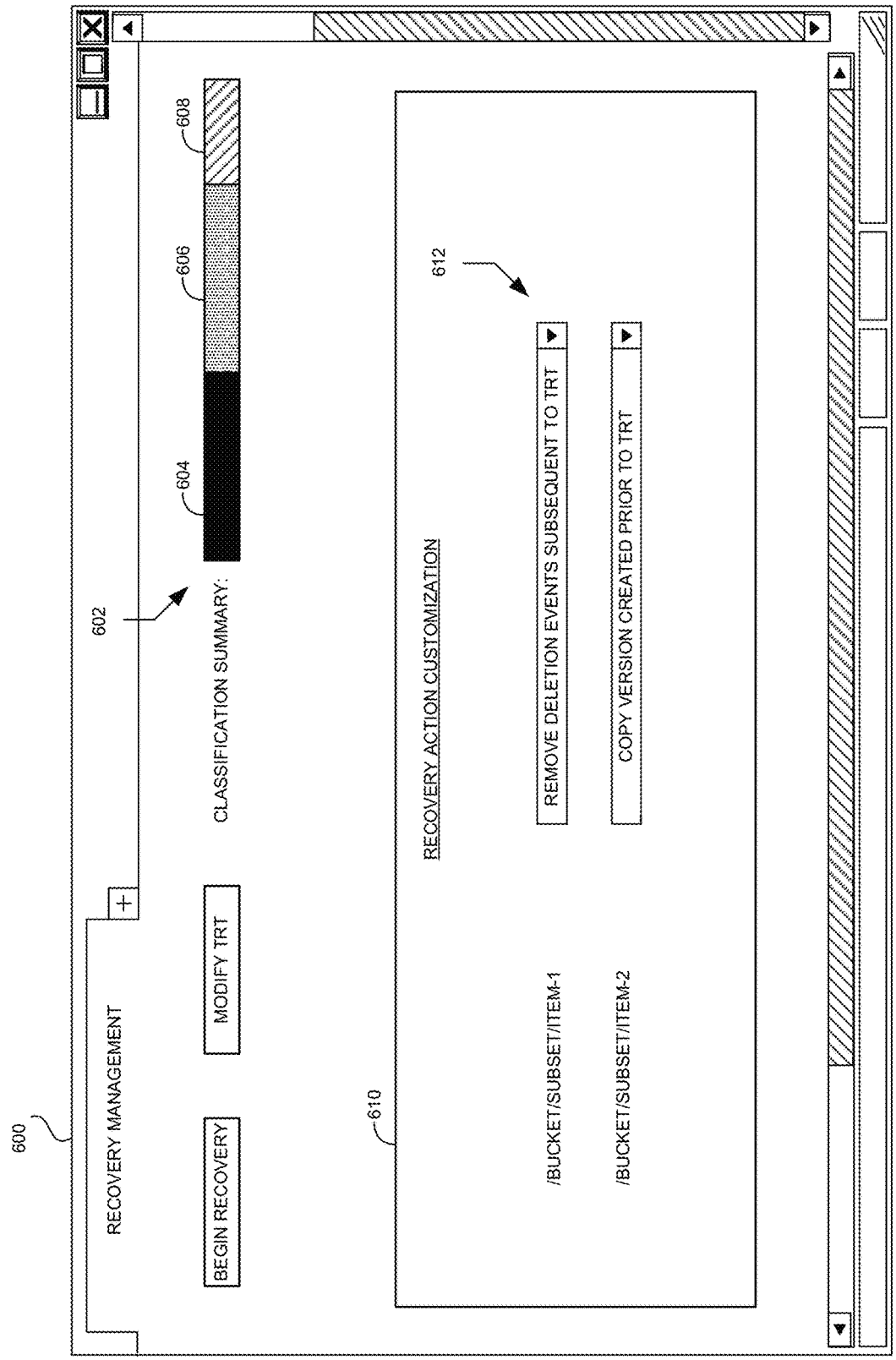
FIG. 6 is a diagram of an illustrative user interface showing classified data items according to some embodiments.

FIG. 6 shows an illustrative user interface 600 that may be used to view and modify recovery actions for data items. In some embodiments, the user interface 600 may be a network resource, such as a web page, that is provided to a client device 106 by the recovery management system 104 or some other system. As shown, the user interface 600 may include a summary 602 that graphically summarizes certain results of classification of data items in one or more regions 604, 606, and 608. The summary 602 may include a first region 604 to indicate which data items in the data set to be recovered are recoverable (e.g., based on classification and corresponding available recovery operations for the data items), a second region 606 to indicate which data items in the data set have conflicts that a user is to resolve (e.g., based on classification and multiple corresponding available recovery operations for each of the data items), and a third region 608 to indicate which data items in the data set are unrecoverable (e.g., based on classification and lack of corresponding available recovery operations for the data items). Illustratively, the relative sizes of the regions 604, 606, and 608 may be indicative of the relative quantities of data items represented by each of the regions. In some embodiments, the user interface 600 may include a timeline 402 and slider control 404 as in the user interface 400 to allow a user to select a new TRT and obtain an updated summary 600 for the new TRT.

In some embodiments, as shown, the user interface 600 may further include a recovery operation customization section 610 in which recovery operations for individual data items may be presented and customized. For example, individual data items or groups thereof may be listed with interactive recovery selection controls 612 that allow a user to accept the recommended recovery action or override the recommendation and select a different recovery action.

At decision block 310, the recovery management system 104 or some other system can determine whether to proceed with a recovery process. For example, as described above, the initial classification results and recovery actions may be presented to a user via user interface 600. If the user accepts the results, the routine 300 may proceed with performance of recovery actions. Otherwise, the routine 300 may return to block 304 for specification of a new TRT. In some cases, the routine 300 may terminate.

At block 312, the recovery management system 104 or some other system may initiate performance of actions for data items classified in a first recovery class. In some embodiments, the first recovery class includes data items satisfying one or more TRT and metadata-based criteria, such as all data storage events newer than the TRT being deletion events, and at least one version creation event prior to the TRT (e.g., the "R-OK-1" recovery class described above). In this example, the default recovery action may be to delete all metadata items for deletion events subsequent to the TRT, thus making available a version of the data items with a most-recent timestamp occurring prior to the TRT. The effect of this recovery operation is to roll back the state of the data objects in the first recovery class to their state at the TRT.

At block 314, the recovery management system 104 or some other component may initiate performance of actions for data items classified in a second recovery class. In some embodiments, the second recovery class includes data items satisfying one or more TRT and metadata-based criteria, such as all data storage events are older than the TRT, and the metadata items with the most recent timestamp prior to the TRT represent version creation events or otherwise do not represent deletion events (e.g., the "R-OK-2" recovery class described above). In this example, the default recovery action may be to take no action, thus continuing to make available a version of the data items with a most-recent timestamp occurring prior to the TRT. The effect of taking no action is that the state of the data objects in the second recovery class will remain in the state that they were in at the TRT.

At block 316, the recovery management system 104 or some other system may initiate performance of actions for data items classified in a third recovery class. In some embodiments, the third recovery class includes data items satisfying one or more TRT and metadata-based criteria, such as there being version creation events or data storage events otherwise different than deletion events occurring more recently than the TRT (e.g., the "R-USER-1" recovery class described above). In this example, the default recovery action may be to copy the version of the data item created most-recently before the TRT as a new version with a timestamp that is most recent overall for the data item. Thus, there would be no data loss in rolling back the state of data objects in the third recovery class to their state at the TRT, even if there were versions created after the TRT. The versions created after the TRT would remain available for future recovery operations.

At block 318, the recovery management system 104 or some other system may initiate performance of actions for data items classified in a fourth recovery class. In some embodiments, the fourth recovery class includes data items satisfying one or more TRT and metadata-based criteria, such as all data storage events being older than the TRT, and where the most recent data storage event represented by the metadata is a deletion event (e.g., the "R-USER-2" recovery class described above). In this example, the default recovery action may be to take no action, thus maintaining the deletion (or otherwise the unavailability) of a version of the data item at the time of the TRT.

At block 320, the recovery management system 104 or some other system may initiate performance of actions for data items classified in a fifth recovery class. In some embodiments, the fifth recovery class includes data items satisfying one or more TRT and metadata-based criteria, such as having only deletion events, and no version creation events (e.g., the "R-X" recovery class described above). In this example, the default recovery action may be to take no action, because there is no version available to make available at any point, regardless of the TRT.

At block 322, the recovery management system 104 or some other system may initiate performance of actions overridden or otherwise selected by a user. In some embodiments, a user may use a graphical interface as described herein to override or otherwise select recovery actions for individual data items or groups thereof. For example, for data items classified in the third recovery class described above, a user may override the default action of copying an older version with a new timestamp. Instead, the user may select a different recovery action, such as removal (as opposed to marked deletion) of any version of the data item created after the TRT, and removal of any deletion metadata item with a timestamp after the TRT. As another example, for data items classified in the fourth recovery class described above, a user may override the default of performing no recovery action. Instead, the user may select a different TRT so that a version creation event is the event with the most recent timestamp prior to the TRT.

Figure 7:
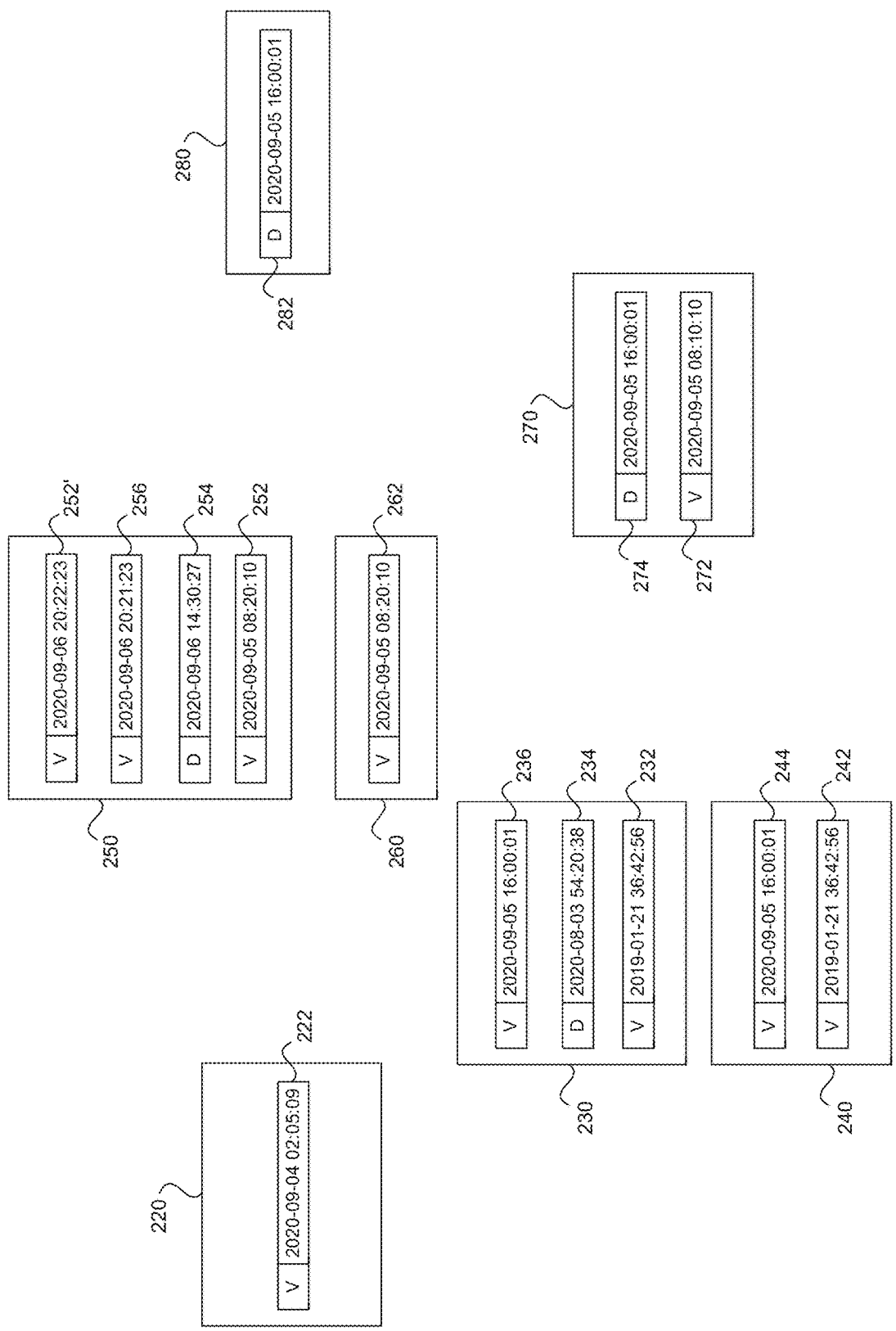
FIG. 7 is a block diagram of illustrative data item metadata after a recovery operation according to some embodiments.

FIG. 7 is a block diagram of illustrative data item metadata after performance of recovery operations according to some embodiments.

As shown, metadata 220 for data item 200 has been modified to remove metadata item 224, which recorded a deletion event. Thus, the version represented by metadata item 222 is now available due to its creation prior to the TRT with no subsequent deletion event remaining.

Metadata 230 and 240 for data items 202 and 204, respectively, has not been modified. Thus, the same versions of data items 202 and 204, represented by metadata items 236 and 244, respectively, remain available after the recovery process due to their creation prior to the TRT.

Metadata 250 and 260 for data items 206 and 208, respectively, has been modified to make available versions of data items 206 and 208 created prior to the TRT, even though one or more versions of those data items were created subsequent to the TRT. In one example, metadata 250 has been modified with duplication of a data item version represented by metadata item 252. The duplicated version is associated with a new metadata item 252' and given a new timestamp subsequent to other existing versions. Beneficially, this allows other versions of data item 206 to remain available for possible future recovery actions (in some cases including the original metadata item 252 of which the new metadata item 252' is a duplicate), thereby avoiding data loss. In another example, metadata 260 has been modified with removal of data item versions created subsequent to the version represented by metadata item 262. This particular method of rolling back data item 208 to the TRT may be selected by a user who is comfortable with data loss, in particular loss of the versions of data item 208 created after the TRT. To reflect this data loss, metadata items 264 and 266 have been removed.

Metadata 270 and 280 for data items 210 and 212, respectively, has not been modified. Thus, data item 210 remains unavailable due to a deletion event occurring before the TRT. Data item 212 remains unavailable due, at least in part, to lack of any available version to recover.

The example default recovery actions and overridden recovery actions described herein are illustrative only, and are not intended to be limiting, required, or exhaustive. In some embodiments, fewer, additional, and/or alternative recovery actions may be used by default or otherwise made available.

The routine 300 may terminate at block 324.

Processing of Data-Item-Specific Version Metadata

Figure 8:
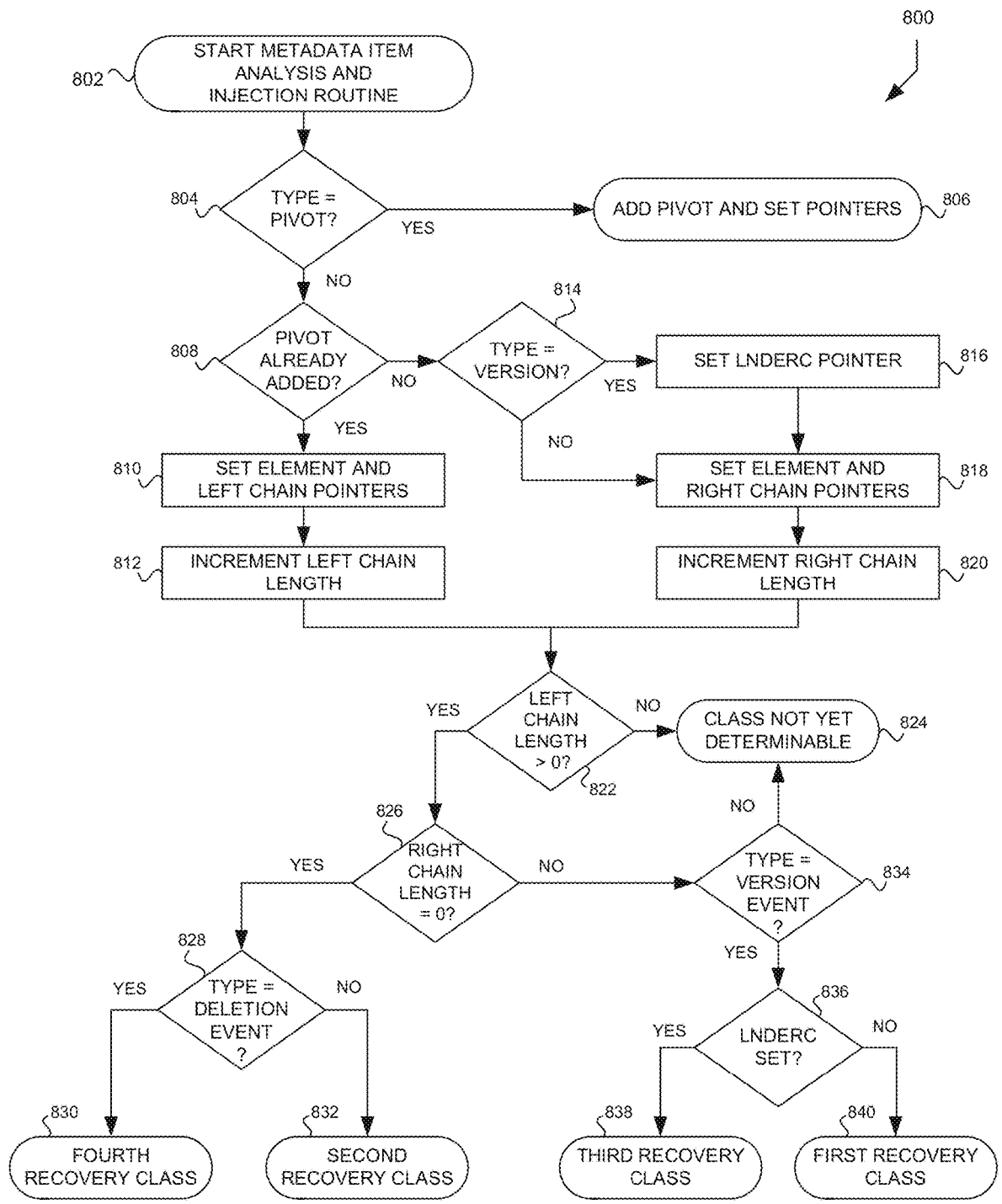
FIG. 8 is a flow diagram of an illustrative routine for classifying data items based on target recovery time according to some embodiments.
Figure 9:
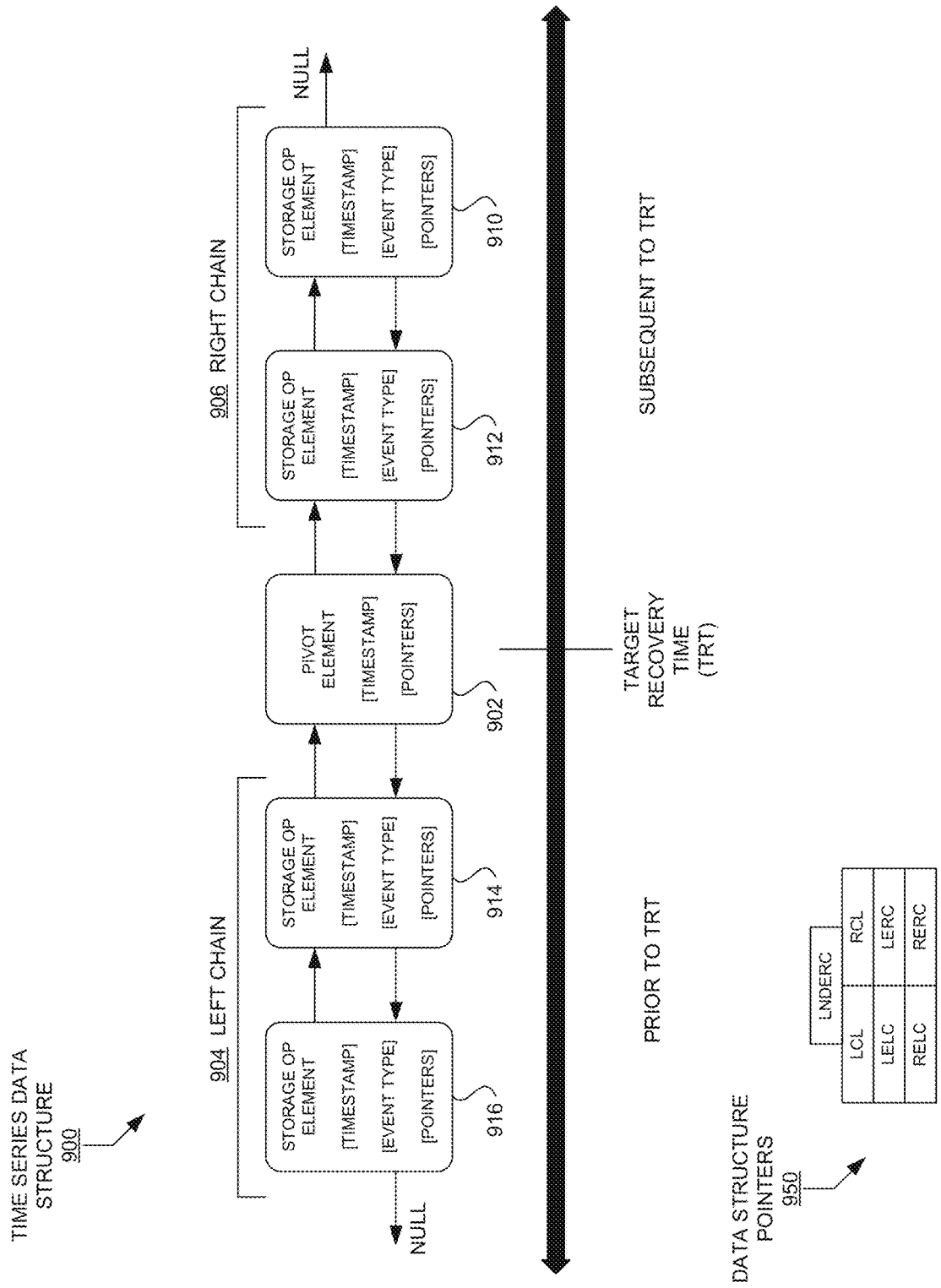
FIG. 9 is a block diagram of an illustrative data structure for classifying data items based on target recovery time according to some embodiments.

FIG. 8 is a flow diagram of an example routine 800 for processing data-item-specific metadata with respect to a TRT in order to classify data items into corresponding recovery classes. Advantageously, the routine 800 may use the time series data structure 900 shown in FIG. 9 to efficiently process metadata and classify data items into recovery classes in an optimized manner. The routine 800 may be executed separately, and a separate instance of the time series data structure 900 may be generated, for each data item to be classified. The different data items may be classified serially, or in parallel (e.g., using multiple processors). As described below, each iteration of the routine 800 processes a single item of data-item-specific version metadata and, if possible, makes a classification determination. Otherwise, additional iteration(s) are performed. When a data item is to be classified using routine 800, a set of executable program instructions stored on one or more non-transitory computer-readable media (e.g., hard drive, flash memory, removable media, etc.) may be loaded into memory (e.g., random access memory or "RAM") of a computing device and executed.

The routine 800 begins at block 802 with receipt of a metadata item to be processed. The metadata items may be received from the data storage system 102, an index service associated therewith, or an intermediary system. In some embodiments, metadata items are to be iterated using routine 800 in reverse-chronological order. For example, the metadata item with the most recent timestamp is to be processed first, followed by the metadata item with the next most recent timestamp, and so on until a classification determination is made or there are no more metadata items remaining, in which case the data item may be classified into a particular class (e.g., a "R-X" recovery class as described above). The recovery management system 104 or the provider of the metadata items may determine when the first metadata item with a timestamp preceding the TRT is to be processed. Upon making this determination, a separate "pivot" item representing the TRT may be added to the input stream of metadata items and processed using routine 800 as described below.

At decision block 804, the recovery management system 104 or some other system may determine whether the input metadata item (also referred to as the current metadata item) is the pivot item representing the TRT. If so, the routine 800 may proceed to block 806, where a pivot element 902 is added to the time series data structure 900 and various pointers are set. The routine 800 may then return to block 802 for another iteration to process another metadata item. Otherwise, if the input metadata item is not the pivot item, the routine 800 may proceed to decision block 808.

In some embodiments, the time series data structure 900 may be a bidirectional doubly linked list. As such, individual elements of the data structure 900 may include two pointers: one pointer to the element on one side of the current element toward one end of the data structure 900 (e.g., the left side of the current element) and another pointer to the element on the other side of the current element toward the other end of the data structure 900 (e.g., the right side of the current element). Each element may further include data from the corresponding metadata item, such as the data storage event type represented by the metadata item, and the timestamp of the data storage event. The elements may also be referred to as "storage operation elements" to distinguish them from the pivot element. The position within the data structure 900 at which individual elements—whether storage operation elements or the pivot element—are added may dependent upon the specific target recovery time and the timestamps of the metadata items to be represented by the elements.

The pivot element 902 may be treated as a special instance of an element of the data structure 900. For example, the pivot data element 902 may not include data regarding a data storage event because the pivot element 902 does not correspond to a particular metadata item representing a data storage event. In addition, the subset of data structure elements to the left side of the pivot element 902, which correspond to data storage events occurring prior to the TRT, may be treated as a group: the left chain 904. The subset of elements to the right side of the pivot element 902, which correspond to data storage events occurring subsequent to the TRT, may be treated as a group: the right chain 906. A separate set of data structure pointers 950 may be used to maintain pointers to the left-most element of the left chain (LELC), the right-most element of the left chain (RLEC), the left-most element of the right chain (LERC), and the right-most element of the right chain (RERC). Additional information regarding the length of the left chain (LCL) and the length of the right chain (RCL) may also be maintained and used as described below.

At decision block 808, after determining that the current metadata item being processed is not a pivot item, the recovery management system 104 may determine whether the pivot item has been previously processed and added to the data structure 900. If so, the routine 800 may proceed to block 810 at which a new element is added to the left chain 904 to represent the current metadata item, which, because metadata items are processed in reverse-chronological order, is associated with a timestamp prior to the TRT. Otherwise, if the pivot element 902 has not already been added, the routine 800 may proceed to decision block 814 to begin the process of adding a new element to the right chain 906 to represent the current metadata item, which is associated with a timestamp subsequent to the TRT.

At block 810, the recovery management system 104 may set pointers for the element being added for the current metadata item (also referred to as the "current element"). Setting pointers for the element being added may involve setting a forward-direction or right-hand pointer of the current element to point to the last previously-added element, and setting a rearward-direction or left-hand point of the last previously-added element to the current element.

In some embodiments, the recovery management system 104 may determine whether the RELC (or LELC) pointer has been set. If not, then the left chain 904 does not yet have any elements, and the first element of the left chain 904 may be added (e.g., element 914) for the current metadata item. In this case, both the RELC and LELC pointers may be set to the element added for the current metadata item. Otherwise, if the RELC (or LELC) pointer has already been set, then an element has already been added to the left chain 904 and an additional element may be added (e.g., element 916) for the current metadata item. In this case, the LELC pointer may be set to the element added for the current metadata item, and the RELC point may remain unchanged.

At block 812, the recovery management system 104 may increment the length of the left chain 904 (LCL) to account for the current element that has been added to the left chain 904.

At decision block 814, after determining that the pivot element has not already been added to the data structure, the recovery management system 104 may determine the type of storage operation represented by the current metadata item. If the type is a version creation operation, the routine 800 may proceed to block 816 where a particular pointer relevant to certain classification decisions is set. In particular, a pointer for the left-most non-delete element on the right chain (LNDERC) may be set.

At block 818, the recovery management system 104 may set pointers for the current element. The recovery management system 104 may also set pointers for the right chain 906.

In some embodiments, the recovery management system 104 may determine whether the LERC (or RERC) pointer has been set. If not, then the right chain 906 does not yet have any elements, and the first element of the right chain 906 may be added (e.g., element 910) for the current metadata item. In this case, both the LERC and RERC pointers may be set to the element added for the current metadata item. Otherwise, if the LERC (or RERC) pointer has already been set, then an element has already been added to the right chain 906 and an additional element may be added (e.g., element 912) for the current metadata item. In this case, the LERC pointer may be set to the element added for the current metadata item, and the RERC point may remain unchanged.

At block 820, the recovery management system 104 may increment the length of the right chain 906 (RCL) to account for the current element that has been added to the right chain 906.

At decision block 822, the recovery management system 104 may determine whether the length of the left chain satisfies a threshold (e.g., is greater than zero). If not, the routine 800 may proceed to block 824 where the current iteration ends because a class is not yet determinable. Illustratively, this may be because there are no known data storage operations from before the TRT. Otherwise, if the threshold LCL is satisfied (e.g., greater than zero), the routine 800 may proceed to decision block 826.

At decision block 826, the recovery management system 104 may determine whether the length of the right chain satisfies a threshold (e.g., is equal to zero). If not, the routine 800 may proceed to decision block 834 to determine whether the storage operation represented by the current element is a version creation event or a deletion event. If not a version creation event, then the routine 800 may proceed to block 824 because a recovery class is not yet determinable. Illustratively, this may be because there are no known version creation events from before the TRT. Otherwise, if the storage operation represented by the current element is a version creation event, the routine 800 may proceed to decision block 836.

At decision block 836, the recovery management system 104 may determine whether the LNDERC pointer is set, indicating that there exists in the right chain 906 a non-delete element (e.g., an element representing a version creation operation). If the LNDERC is not yet set, the routine 800 may proceed to block 840 where the data item is classified. For example, the data item may be classified in the first recovery class described above where there the only events subsequent to TRT are delete events, and there are version creation events prior to the TRT. Otherwise, if the LNDERC is set, the routine 800 may proceed to block 838, where the data item is classified into a different recovery class. For example, the data item may be classified in the third recovery class described above where there are version creation events both prior to and subsequent to the TRT.

At decision block 828, the recovery management system 104 may determine whether the current element represents a deletion event. If not, the routine 800 may proceed to block 832 where the data item is classified. For example, the data item may be classified in the second recovery class described above where there are no events subsequent to the TRT, and the event immediately preceding the TRT is not a deletion event (e.g., is a version creation event). Otherwise, if the current elements represents a deletion event, the routine 800 may proceed to block 830 where the data item is classified into a different recovery class. For example, the data item may be classified in the fourth recovery class described above where there are no events subsequent to the TRT, and the event immediately preceding the TRT is a deletion event.

Execution Environment

Figure 10:
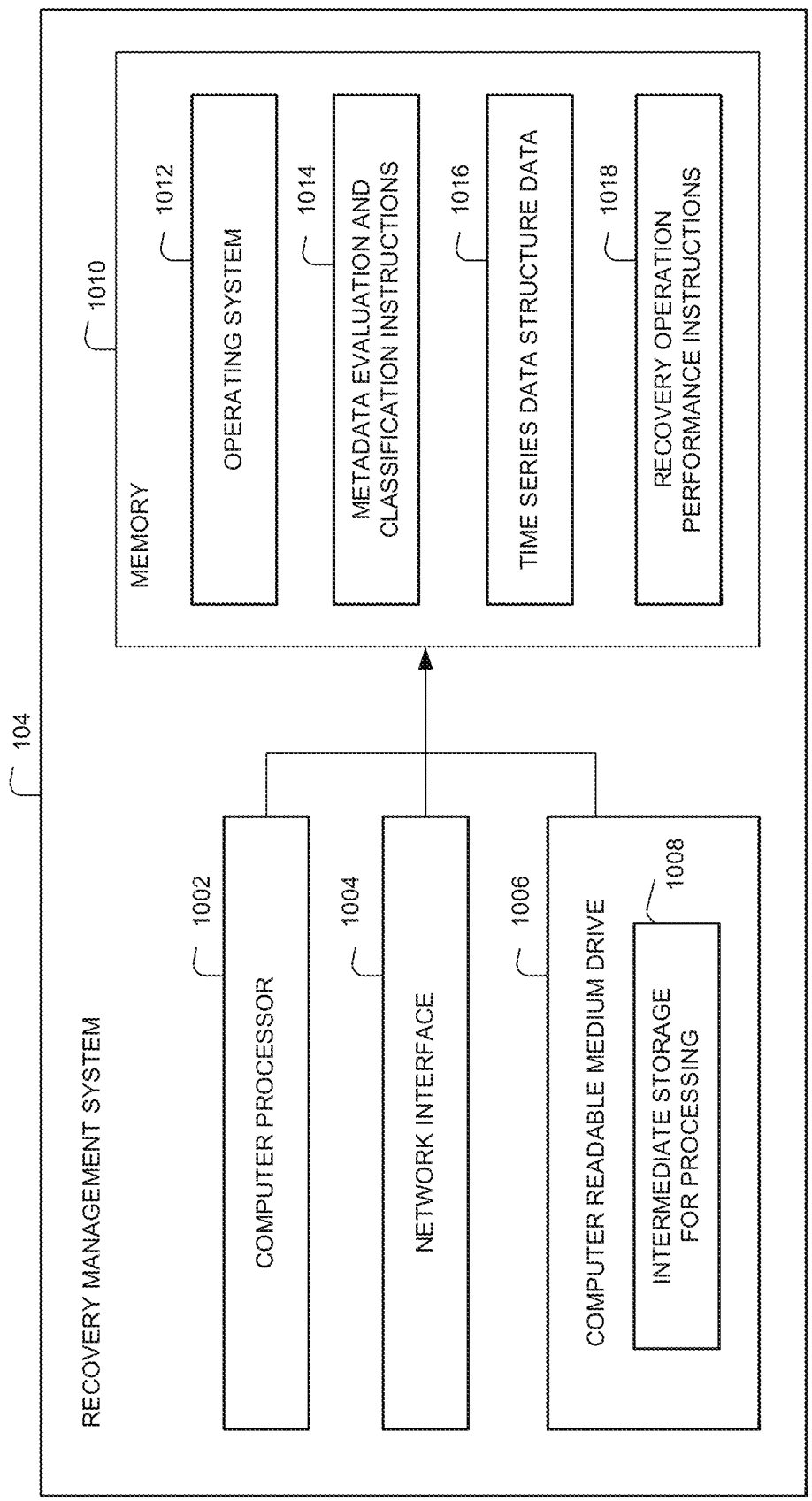
FIG. 10 is a block diagram depicting illustrative computing components of a recovery management system according to some embodiments.

FIG. 10 illustrates various components of an example recovery management system 104 configured to implement various functionality described herein. The recovery management system 104 may be implemented on a physical host computing device, separately or in tandem with components of the data storage system 102.

In some embodiments, as shown, a recovery management system 104 may include: one or more computer processors 1002, such as physical central processing units (CPUs); one or more network interfaces 1004, such as a network interface cards (NICs); one or more computer readable medium drives 1006, such as a high density disk (HDDs), solid state drives (SSDs), flash drives, and/or other persistent non-transitory computer-readable media; and one or more computer readable memories 1010, such as random access memory (RAM) and/or other volatile non-transitory computer-readable media.

Storage, such as a computer readable medium drive 1006 or computer readable memory 1010, may be used in part as intermediate storage for processing 1008. For example, as version metadata is obtained by the recovery management system 104 (e.g., from the data storage system 102), the metadata may be stored in the intermediate storage for processing 1008, where it may be maintained, sorted, and/or otherwise manipulated to produce input to the metadata item analysis and injection routine 800.

The computer readable memory 1010 may include computer program instructions that one or more computer processors 1002 execute in order to implement one or more embodiments. The computer readable memory 1010 can store an operating system 1012 that provides computer program instructions for use by the computer processor(s) 1002 in the general administration and operation of the recovery management system 104.

In some embodiments, the computer readable memory 1010 can further include computer program instructions and other information for implementing aspects of the present disclosure. For example, the computer-readable memory 1010 may include metadata evaluation and classification instructions 1014 for performing aspects of routines 300 and/or 800. As another example, the computer-readable memory 1010 may include time series data structure data 1016 representing a time series data structure 900. As a further example, the computer-readable memory 1010 may include recovery operation performance instructions for performing recovery operations to roll back a data set to a target recovery time.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A data storage system comprising:
a data store comprising one or more physical data storage media, wherein data stored on the one or more physical data storage media is organized into a plurality of buckets, wherein a first bucket of the plurality of buckets stores a plurality of data objects, and wherein a first data object of the plurality of data objects is associated with version metadata representing a plurality of versions of the first data object; and
a recovery management system comprising one or more processors and computer-readable memory, wherein the recovery management system is configured to at least:
receive, via a graphical user interface, selection of a target recovery time for the first bucket;
classify individual data objects of the plurality of data objects into corresponding recovery classes of a plurality of recovery classes, wherein the first data object is classified into a first recovery class based on an evaluation of the version metadata with respect to the target recovery time, and wherein the first recovery class is associated with a first recovery action that is different from a second recovery action associated with a second recovery class of the plurality of recovery classes;
generate an updated graphical user interface that presents data regarding the first recovery class into which the first data object is classified;
receive, via the updated graphical user interface, a command to execute a plurality of recovery actions on the first bucket, including execution of the first recovery action on the version metadata associated with the first data object; and
execute the plurality of recovery actions on the first bucket, wherein execution of the first recovery action on the version metadata associated with the first data object modifies the version metadata to make available a version of the first data object created prior to the target recovery time.

2. The data storage system of claim 1, wherein the recovery management system is further configured to generate the graphical user interface comprising a graphic object configured to be moved with respect to a timeline, wherein the target recovery time corresponds to a position on the timeline to which the graphic object is moved.

3. The data storage system of claim 1, wherein the plurality of recovery classes comprises: the first recovery class associated with presence of a data object version having a version creation time preceding the target recovery time; a second recovery class associated with presence of a data object version having a version deletion time preceding the target recovery time; a third recovery class associated with presence of a data object version having a version creation time subsequent to the target recovery time; a fourth recovery class associated with presence of a data object version having a version deletion time subsequent to the target recovery time; and a fifth recovery class associated with a data object version having at least one version deletion time and no version creation time.

4. The data storage system of claim 1, wherein the first recovery action comprises one of: removal of an item of data-object-specific version metadata representing a version deletion time; copy of a prior version of the first data object and generation of an item of data-object-specific version metadata representing a new version creation time; deletion of an item of data-object-specific version metadata representing a version creation time; or recommendation of a different target recovery time.

5. A computer-implemented method comprising:
under control of a computing system comprising memory and one or more computer processors configured to execute specific instructions:
determining, for each data item of a plurality of data items, a corresponding recovery class based at least partly on a target recovery time and data-item-specific version metadata, wherein each data item of the plurality of data items is associated with a different set of data-item-specific version metadata;
determining, for at least a subset of the plurality of data items, a corresponding recovery action based at least partly on the corresponding recovery class; and
performing recovery actions corresponding to at least the subset of the plurality of data items, wherein performing a first recovery action corresponding to a first data item of the subset of the plurality of data items comprises modifying first item-specific version metadata associated with the first data item to make available a version of the first data item created prior to the target recovery time.

6. The computer-implemented method of claim 5, further comprising receiving, via a graphical user interface, interaction data representing the target recovery time, wherein the graphical user interface comprises a graphic object configured to be moved with respect to a timeline, and wherein the target recovery time corresponds to a position on the timeline to which the graphic object is moved.

7. The computer-implemented method of claim 5, further comprising presenting, via a graphical user interface, classification data representing recovery classes and corresponding recovery actions for at least the subset of the plurality of data items, wherein the graphical user interface comprises a interactive control to modify at least one of a recovery action or the target recovery time.

8. The computer-implemented method of claim 5, wherein determining the corresponding recovery class for each data item of the plurality of data items comprises determining, for the first data item, a particular recovery class of a plurality of recovery classes, wherein the particular recovery class indicates that any data-item-specific version metadata associated with the first data item and having timestamp subsequent to the target recovery time represents a deletion event.

9. The computer-implemented method of claim 5, wherein determining the corresponding recovery class for each data item of the plurality of data items comprises determining, for the first data item, a particular recovery class of a plurality of recovery classes, wherein the particular recovery class indicates that (1) any data-item-specific version metadata associated with the first data item has a timestamp prior to the target recovery time, and (2) an item of data-item-specific version having a timestamp closest to the target recovery time is associated with a version creation event.

10. The computer-implemented method of claim 5, wherein determining the corresponding recovery class for each data item of the plurality of data items comprises determining, for the first data item, a particular recovery class of a plurality of recovery classes, wherein the particular recovery class indicates that an item of data-item-specific version having a timestamp chronologically closest to the target recovery time of any item of data-item-specific version metadata having a timestamp subsequent to the target recovery time.

11. The computer-implemented method of claim 5, wherein determining the corresponding recovery class for each data item of the plurality of data items comprises determining, for the first data item, a particular recovery class of a plurality of recovery classes, wherein the particular recovery class indicates that (1) any data-item-specific version metadata associated with the first data item has a timestamp prior to the target recovery time, and (2) an item of data-item-specific version having a timestamp closest to the target recovery time is associated with a deletion creation event.

12. The computer-implemented method of claim 5, wherein determining the corresponding recovery class for each data item of the plurality of data items comprises determining, for the first data item, a particular recovery class of a plurality of recovery classes, wherein the particular recovery class indicates that any data-item-specific version metadata associated with the first data item and having a timestamp prior to the target recovery time is associated with a deletion creation event.

13. The computer-implemented method of claim 5, wherein determining the corresponding recovery action for each data item of the plurality of data items comprises determining, for the first data item of the plurality of data items, the first recovery action comprising one of: removal of an item of data-item-specific version metadata representing a version deletion time; copy of a version of the first data item and generation of an item of data-item-specific version metadata representing a new version creation time; deletion of an item of data-item-specific version metadata representing a version creation time; or recommendation of a different target recovery time.

14. A system comprising:
computer-readable memory storing executable instructions; and
one or more computing devices programmed by the executable instructions to at least:
determine, for each data item of a plurality of data items, a corresponding recovery class based at least partly on a target recovery time and data-item-specific version metadata, wherein each data item of the plurality of data items is associated with a different set of data-item-specific version metadata;
determine, for at least a subset of the plurality of data items, a corresponding recovery action based at least partly on the corresponding recovery class; and perform recovery actions corresponding to at least the subset of the plurality of data items, wherein a first recovery action corresponding to a first data item of the subset of the plurality of data items comprises modification of first item-specific version metadata associated with the first data item to make available a version of the first data item created prior to the target recovery time.

15. The system of claim 14, wherein the one or more computing devices are programmed by further executable instructions to receive, via a graphical user interface, interaction data representing the target recovery time, wherein the graphical user interface comprises a graphic object configured to be moved with respect to a timeline, and wherein the target recovery time corresponds to a position on the timeline to which the graphic object is moved.

16. The system of claim 14, wherein the one or more computing devices are programmed by further executable instructions to present, via a graphical user interface, classification data representing recovery classes and corresponding recovery actions for at least the subset of the plurality of data items, wherein the graphical user interface comprises a interactive control to modify at least one of a recovery action or the target recovery time.

17. The system of claim 14, wherein to determine the corresponding recovery class for each data item of the plurality of data items, the one or more computing devices are programmed by further executable instructions to determine, for the first data item, a particular recovery class of a plurality of recovery classes, wherein the particular recovery class indicates that any data-item-specific version metadata associated with the first data item and having timestamp subsequent to the target recovery time represents a deletion event.

18. The system of claim 14, wherein to determine the corresponding recovery class for each data item of the plurality of data items, the one or more computing devices are programmed by further executable instructions to determine, for the first data item, a particular recovery class of a plurality of recovery classes, wherein the particular recovery class indicates that (1) any data-item-specific version metadata associated with the first data item has a timestamp prior to the target recovery time, and (2) an item of data-item-specific version having a timestamp closest to the target recovery time is associated with a version creation event.

19. The system of claim 14, wherein to determine the corresponding recovery class for each data item of the plurality of data items, the one or more computing devices are programmed by further executable instructions to determine, for the first data item, a particular recovery class of a plurality of recovery classes, wherein the particular recovery class indicates that an item of data-item-specific version having a timestamp chronologically closest to the target recovery time of any item of data-item-specific version metadata having a timestamp subsequent to the target recovery time.

20. The system of claim 14, wherein to determine the corresponding recovery class for each data item of the plurality of data items, the one or more computing devices are programmed by further executable instructions to determine, for the first data item, a particular recovery class of a plurality of recovery classes, wherein the particular recovery class indicates that (1) any data-item-specific version metadata associated with the first data item has a timestamp prior to the target recovery time, and (2) an item of data-item-specific version having a timestamp closest to the target recovery time is associated with a deletion creation event.

* * * * *